(12) United States Patent
Lin et al.

(10) Patent No.: US 7,742,249 B2
(45) Date of Patent: Jun. 22, 2010

(54) COLOR WHEEL

(75) Inventors: Kuo-Chiang Lin, Hsinchu (TW);
Hsin-Chung Lin, Hsinchu (TW);
Fu-Ming Chuang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 193 days.

(21) Appl. No.: 11/829,304

(22) Filed: Jul. 27, 2007

(65) Prior Publication Data
US 2008/0192372 A1 Aug. 14, 2008

(30) Foreign Application Priority Data
Feb. 12, 2007 (TW) .............................. 96105014 A

(51) Int. Cl.
*G02B 5/22* (2006.01)
*G03B 21/14* (2006.01)

(52) U.S. Cl. .................... 359/892; 359/891; 353/84
(58) Field of Classification Search ............... 359/892, 359/891; 353/84
See application file for complete search history.

(56) References Cited

U.S. PATENT DOCUMENTS

| 6,504,598 | B2 | | 1/2003 | Kitano | |
|---|---|---|---|---|---|
| 6,914,734 | B1 | * | 7/2005 | Kao et al. | 359/892 |
| 7,180,691 | B2 | * | 2/2007 | Jia et al. | 359/892 |
| 7,295,392 | B2 | * | 11/2007 | Auell | 359/891 |
| 2006/0087756 | A1 | * | 4/2006 | Yu et al. | 359/892 |

* cited by examiner

*Primary Examiner*—Audrey Y Chang
(74) *Attorney, Agent, or Firm*—J.C. Patents

(57) ABSTRACT

A color wheel includes a fixing base, a ring filter, a washer, and a fixing ring. The fixing base has a protrusion portion and a supporting portion. The ring filter is fit on the protrusion portion. An inner margin of the ring filter leans on the supporting portion. The washer is connected to the protrusion portion. The ring filter is disposed between the washer and the supporting portion. The washer and the supporting portion clip the inner margin of the ring filter. The fixing ring has an annular supporting portion, a side wall surrounding the annular supporting portion, and fixing blocks connected to the side wall and dotted on an outer margin of the ring filter. The outer margin of the ring filter leans on the annular supporting portion. The fixing blocks, the side wall, and the annular supporting portion clip the outer margin of the ring filter.

14 Claims, 10 Drawing Sheets

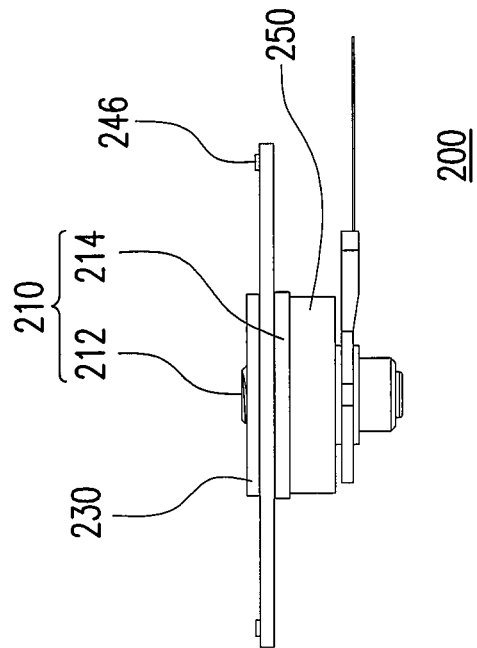
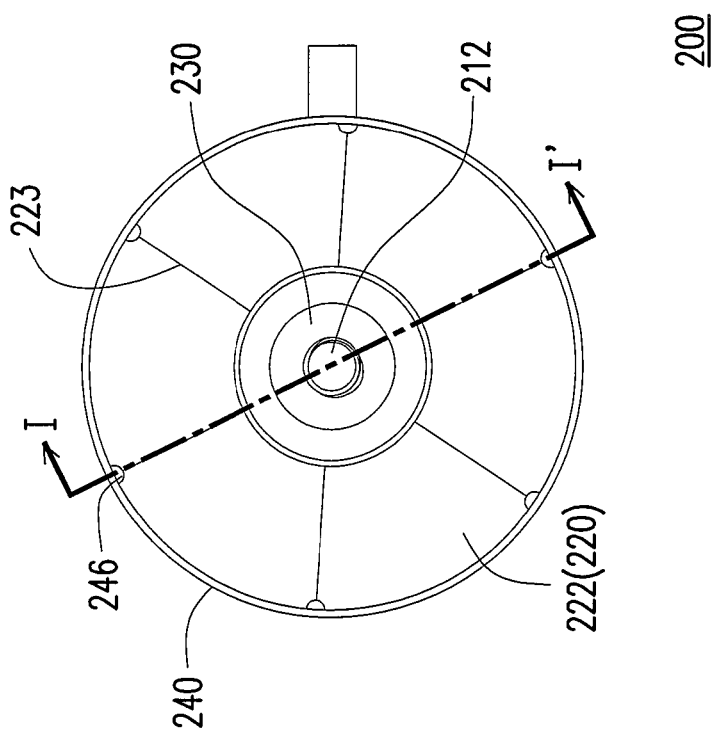
FIG. 2B
FIG. 2A

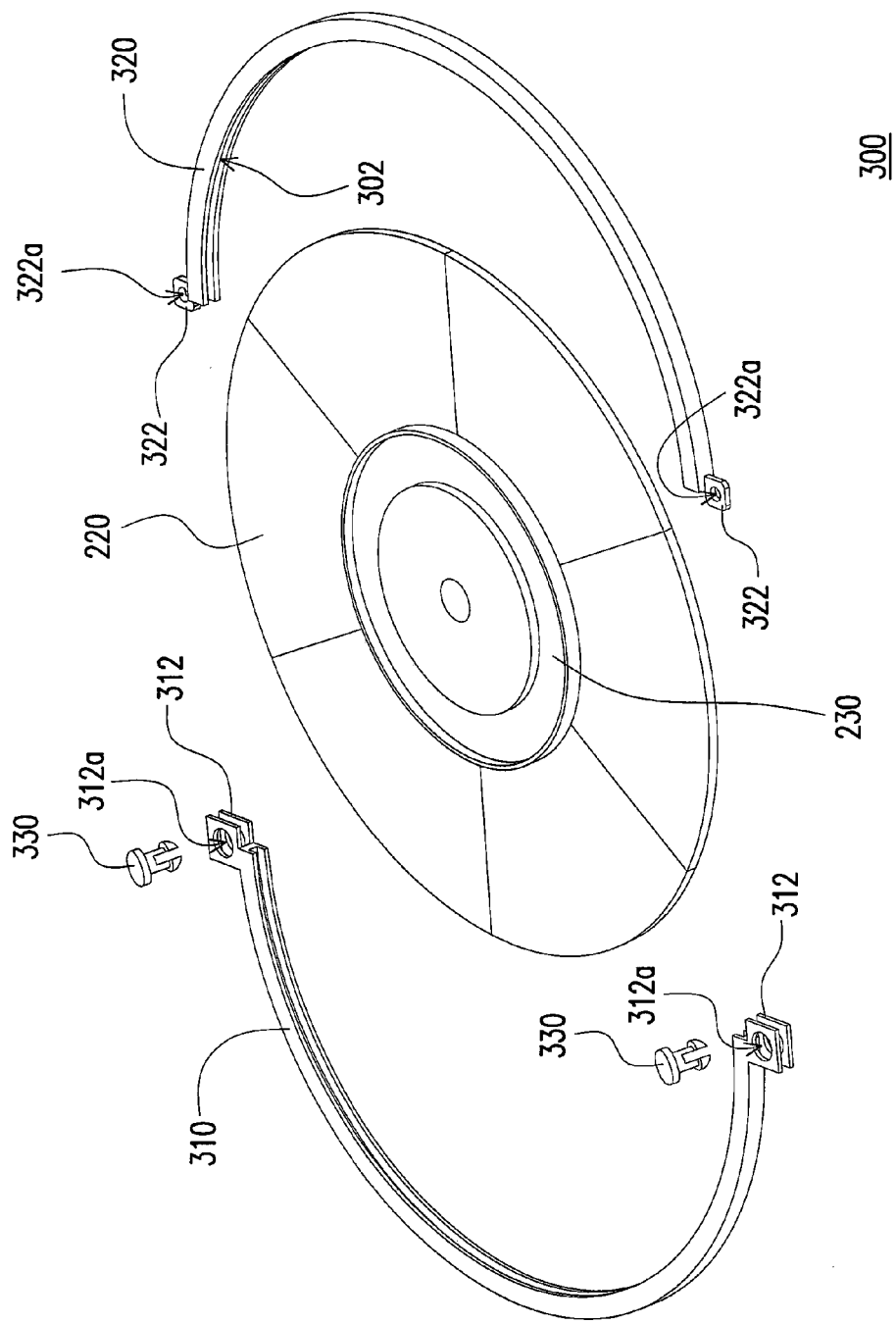

COLOR WHEEL

CROSS-REFERENCE TO RELATED APPLICATION

This application claims the priority benefit of Taiwan application serial no. 96105014, filed on Feb. 12, 2007. All disclosure of the Taiwan application is incorporated herein by reference.

BACKGROUND OF THE INVENTION

1. Field of the Invention

The present invention relates to a projector. More particularly, the present invention relates to a color wheel of a projector.

2. Description of Related Art

Generally, a digital light processing (DLP) projection device includes an illumination system, a digital micro-mirror device (DMD), and a projection lens. The illumination system, capable of providing an illuminating light beam, includes a color wheel and a plurality of lenses. After being filtered by the color wheel, the light beam is focused by the lenses and projected onto the DMD. The DMD has a plurality of micro-mirrors, which are in ON, OFF, or FLAT states respectively, so as to convert the illuminating light beam into an image light beam. The projection lens is used to project the image light beam onto a screen to form an image.

Referring to FIG. 1, a conventional color wheel 100 includes a ring filter 110, a washer 120, and a motor 130. The ring filter 110 is formed by arranging a plurality of sector sub-filters 112, and each of the sub-filters 112 is adhered on the motor 130 by dispensing. The joints between the sub-filters 112 are not adhered. The washer 120 is located above the ring filter 110 and is adhered to the motor 130 by dispensing. However, since it is difficult to control the quality of the adhesive, and the adhesive is easily deteriorated and carbonized after a long-time operation of the motor 130, the sub-filters 112 are likely to come loose and escape when the motor 130 is rotated at a high speed.

In addition, U.S. Pat. No. 6,504,598 and ROC Patent No. 534329 also provide solutions for the problem that the sub-filters may easily come loose and escape when the motor 130 is rotated at a high speed, but each of the solutions must employ an adhesive to achieve the purpose. For example, in the ROC Patent No. 534329, an adhesive material is coated on the two sides of the filter, and in the U.S. Pat. No. 6,504,598, an adhesive of epoxy resin is used to adhere the outer margin of the filter to the inner margin of a circumferential ring. Therefore, the problem that the adhesive is easily deteriorated and carbonized still exists.

SUMMARY OF THE INVENTION

Accordingly, the present invention is directed to provide a color wheel, in which the sub-filters are well secured when the motor is rotated at a high speed.

Other advantages of the present invention can be further comprehended from the technical features disclosed in the present invention.

To achieve one, some or all of the above-mentioned or other objects, one embodiment of the present invention provides a color wheel including a fixing base, a ring filter, a washer and a fixing ring. The fixing base has a protrusion portion and a supporting portion. The ring filter is fit on the protrusion portion and an inner margin of the ring filter leans on the supporting portion. The washer is connected to the protrusion portion, and the ring filter is disposed between the washer and the supporting portion. The washer and the supporting portion are capable of clipping the inner margin of the ring filter. The fixing ring has an annular supporting portion, a side wall that surrounds the annular supporting portion, and a plurality of fixing blocks connected to the side wall. The fixing blocks are dotted on an outer margin of the ring filter. The outer margin of the ring filter leans on the annular supporting portion. The fixing blocks, the side wall, and the annular supporting portion are capable of clipping the outer margin of the ring filter.

Another embodiment of the present invention provides a color wheel including a fixing base, a ring filter, a washer, and a fixing ring. The fixing base has a protrusion portion and a supporting portion. The ring filter is fit on the protrusion portion, and an inner margin of the ring filter leans on the supporting portion. The washer is connected to the protrusion portion, and the washer and the supporting portion are capable of clipping the inner margin of the ring filter. The inner wall of the fixing ring has an annular groove, an outer margin of the ring filter is located in the annular groove, and the two opposite side walls of the annular groove are capable of clipping the outer margin of the ring filter.

As the fixing ring is adopted to clip the ring filter in the present invention, the axial displacement of the ring filter is avoided, and the side wall of the fixing ring secures each sub-filter in the ring filter and thereby reduce the possibility of coming loose and escape due to the centrifugal force when the color wheel is rotated at a high speed. Therefore, the reliability of the color wheel of the present invention is effectively increased. In addition, the fixing ring is formed by two half-rings, so that it is simple to assemble the color wheel, thus improve the assembly efficiency.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A is a top view of a color wheel according to a first embodiment of the present invention.

FIG. 2B is a side view of the color wheel in FIG. 2A.

FIG. 11A is a perspective view of the fixing ring, the washer, and the ring filter in FIG. 9A.

DESCRIPTION OF EMBODIMENTS

Figure 1:
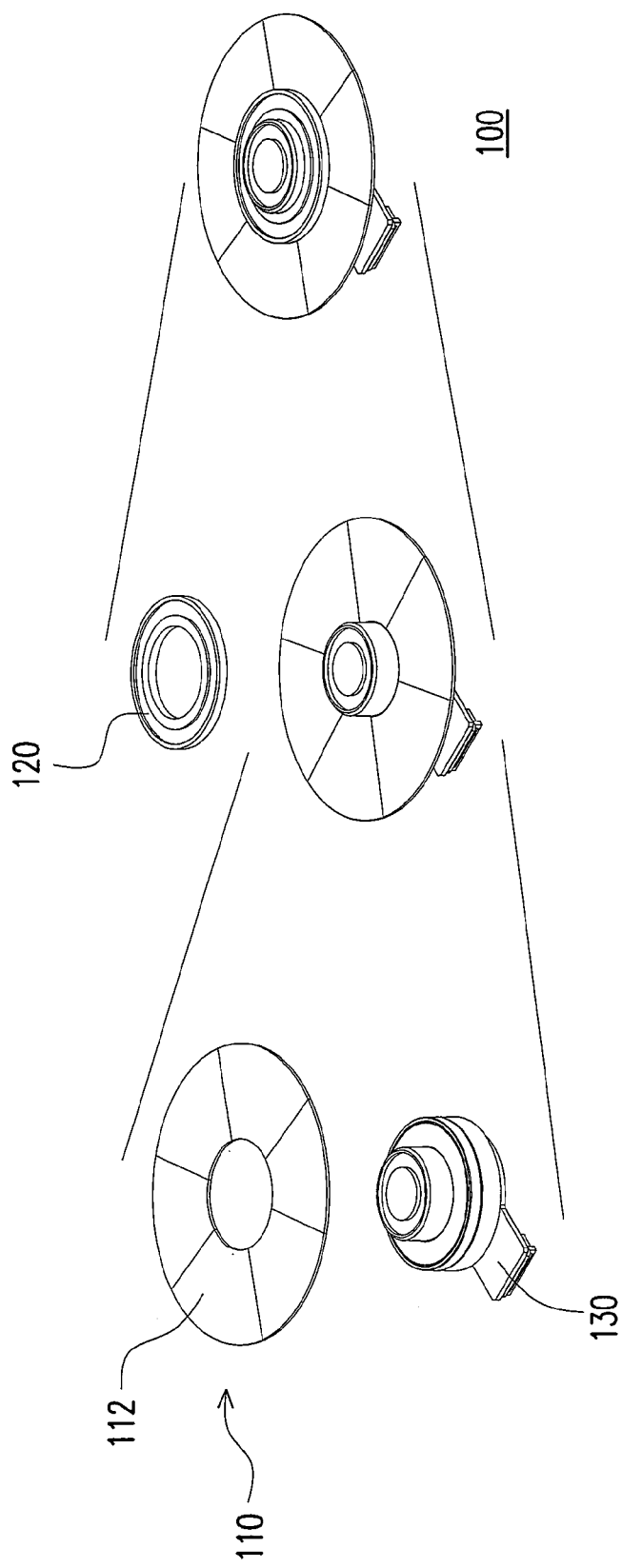
FIG. 1 is an exploded structural view of a conventional color wheel.
Figure 3:
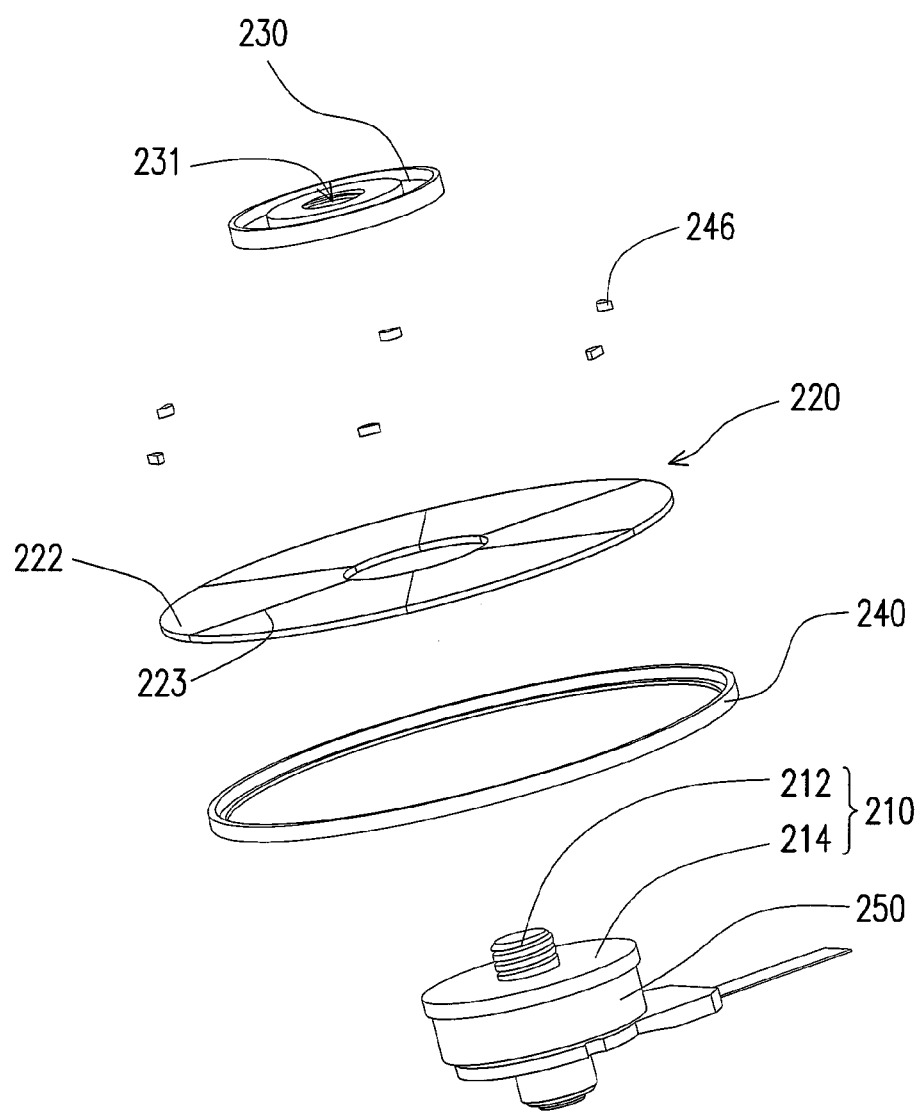
FIG. 3 is an exploded view of the color wheel in FIG. 2A.
Figure 4:
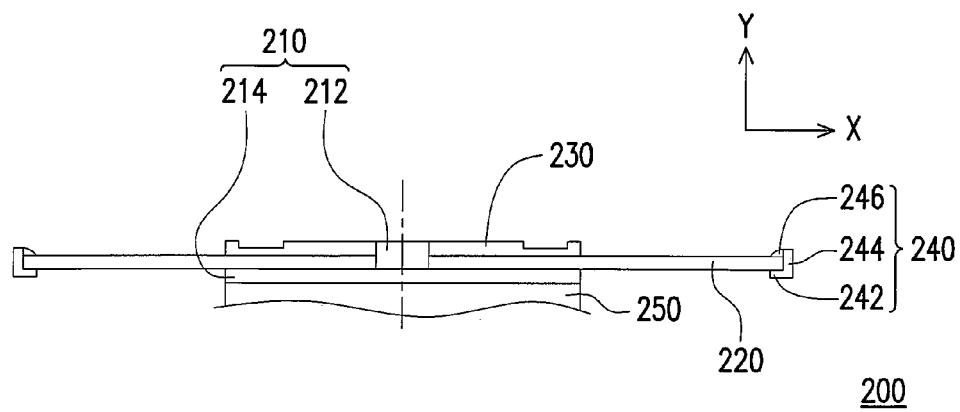
FIG. 4 is a schematic sectional view along Line I-I' in FIG. 2A.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

First Embodiment

Referring to FIGS. 2A, 2B, 3, and 4, a color wheel 200 according to a first embodiment of the present invention includes a fixing base 210, a ring filter 220, a washer 230, and a fixing ring 240. The fixing base 210 has a protrusion portion 212 and a supporting portion 214. The ring filter 220 is fit on the protrusion portion 212, and an inner margin of the ring filter 220 leans on the supporting portion 214. The ring filter 220 is, for example, formed by a plurality of sector sub-filters 222 of different colors. For example, the colors of the sub-filters 222 are red, green, and blue.

The washer 230 is connected to the protrusion portion 212, such that the ring filter 220 is disposed between the washer 230 and the supporting portion 214. The washer 230 and the supporting portion 214 clip the inner margin of the ring filter 220, so as to fix the ring filter 220 onto the fixing base 210.

The fixing ring 240 has an annular supporting portion 242, a side wall 244 that surrounds the annular supporting portion 242, and a plurality of fixing blocks 246 connected to the side wall 244. The fixing blocks 246 are dotted on an outer margin of the ring filter 220, for example, dotted on joints 223 of the outer margins of the sub-filters 222. One end of each fixing block 246 is connected to the side wall 244, and the other end is pressed on the joint 223 of two adjacent sub-filters 222. The outer margin of the ring filter 220 leans on the annular supporting portion 242. The fixing blocks 246, the annular supporting portion 242, and the side wall 244 are capable of clipping the outer margin of the ring filter 220, so as to fix the ring filter 220 onto the fixing ring 240. The fixing blocks 246 avoid axial displacement along a Y-axis of the ring filter 220, and fix the joints 223 of the ring filter 220, thus preventing the sub-filters 222 being separated from each other, such that no gap is generated to cause light leakage. The side wall 244 avoids axial displacement along an X-axis of the ring filter, so as to prevent the sub-filters 222 in the ring filter 220 from departing due to the centrifugal force when the color wheel 200 is rotated at a high speed.

The dotted fixing blocks 246, the annular supporting portion 242, and the side wall 244 are used to clip the ring filter 220, so the ring filter 220 is properly secured and the possibility of coming loose due to the centrifugal force when the color wheel 200 is rotated at a high speed is effectively reduced, and no axial displacement along the Y-axis occurs. Moreover, the color wheel 200 has a simple structure and the material cost is thus reduced. Further, in this embodiment, it is not necessary to adhere the sub-filters 222 of the ring filter 220 onto the fixing base 210 or the joints 223 with a large amount of adhesive, so the deterioration of the adhesive caused by high temperature is prevented, thus the reliability of the color wheel 200 is effectively increased.

In this embodiment, the color wheel 200 further includes a motor 250, the supporting portion 214 of the fixing base 210 is, for example, a surface of a rotating disk of the motor 250, and the protrusion portion 212 is, for example, a rotating shaft of the motor 250. However, the fixing base 210 is also a component independent from the motor 250, the motor 250 has a rotating disk (not shown), and the fixing base 210 is firmly connected to the rotating disk, such that the fixing base 210 is driven to rotate through the rotation of the rotating disk, and this embodiment is not limited herein.

Moreover, when a gap exists between the ring filter 220 and the side wall 244 or between the ring filter 220 and the protrusion portion 212, a buffer member is used to fill the gap, such that the ring filter 220, the side wall 244, and the protrusion portion 212 are securely joined, thereby reducing the possibility of damage caused by the collision between the ring filter 220, the protrusion portion 212, and the side wall 244. In addition, the material of the buffer member is, for example, but not limited to, rubber or silica gel.

Hereinafter, the assembly of the color wheel 200 according to this embodiment is described as follows. First, the inner margin of each sub-filter 222 is leant on the supporting portion 214, and the outer margin of the ring filter 220 is leant on the annular supporting portion 242. Next, the fixing blocks 246 are fixed on the side wall 244 and the ring filter 220. Finally, the washer 230 is connected to the protrusion portion 212.

Figures 5A, 5B:
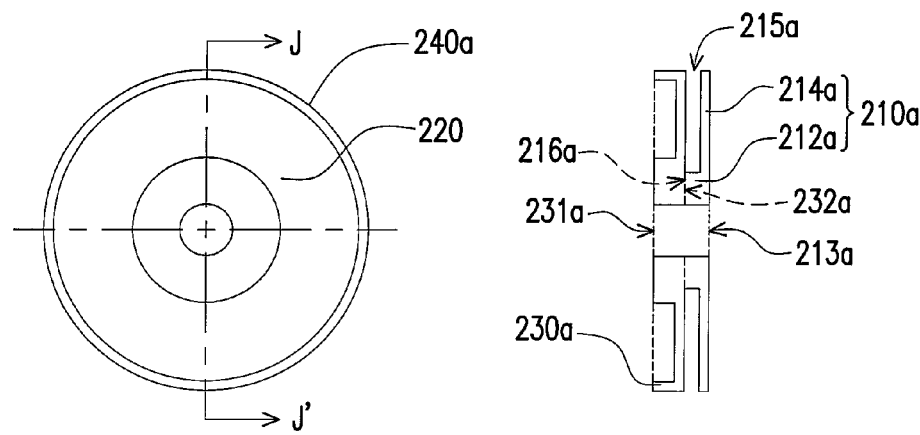
FIG. 5A is a top view of a fixing base and a washer of a color wheel according a second embodiment of the present invention.
FIG. 5B is a sectional view along Line J-J' in FIG. 5A.
Figure 5C:
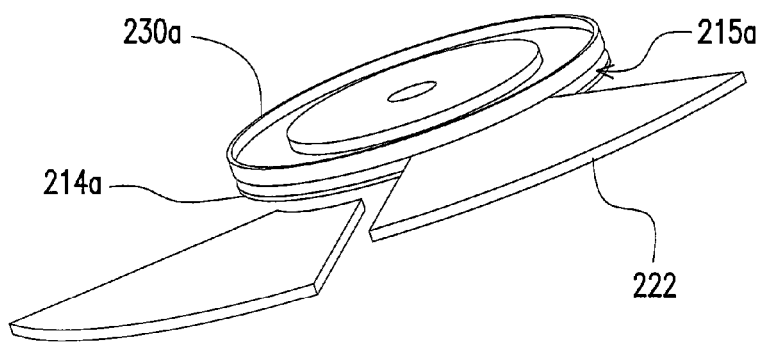
FIG. 5C is a schematic assembly view of the fixing base, the washer, and the ring filter in FIG. 5A.
Figure 6:
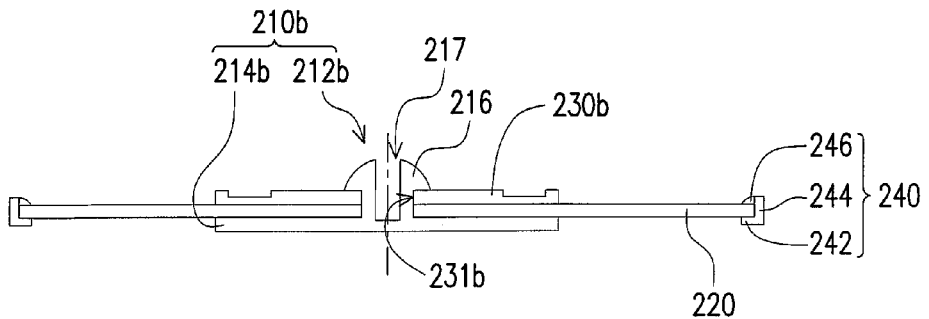
FIG. 6 is a sectional view of a color wheel according to another embodiment of the present invention.

The washer 230 and the protrusion portion 212 are connected by means of screw locking, integral formation, or snapping, and so on. For example, in screw locking scheme, referring to FIG. 3, the washer 230 has a tapped hole 231, and the protrusion portion 212 has an external thread for being screwed with the tapped hole 231, so as to connect the washer 230 to the protrusion portion 212. Referring to FIGS. 5A to 5C, the fixing base 210a and the washer 230a are integrally formed or not, and the fixing base 210a is a component of the motor or a component independent from the motor. For example, the fixing base 210a and the washer 230a are integrally formed. The protrusion portion 212a of the fixing base 210a has a center hole 213a, the washer 230a has a center hole 231a communicating with the center hole 213a, and the center holes 213a, 231a are connected to a rotating shaft (not shown) of the motor. An accommodation space 215a is formed between the washer 230a, the protrusion portion 212a, and the supporting portion 214a, and the inner margin of each sub-filter 222 of the ring filter 220 is disposed in the accommodation space 215a by inserting, so as to form a ring filter. On the other hand, the fixing base 210a and the washer 230a are independent components respectively. The difference between the fixing base 210a and the washer 230a integrally formed or not is the joint place of the fixing base 210a and the washer 230a. The difference is illustrated in detail below, and the similarities thereof will not be described herein again. A top surface 216a of the protrusion portion 212a of the fixing base 210a is pressed by a bottom surface 232a of the washer 230a for forming an accommodation space 215a between the washer 230a, the protrusion portion 212a, and the supporting portion 214a, and the inner margin of the ring filter 222 is disposed in the accommodation space 215a. In the snapping scheme, referring to FIG. 6, the washer 230b and the fixing base 210 are separate components, in which the fixing base 210 is a component of the motor or a component independent from the motor. The fixing base 210b includes a supporting portion 214b and a protrusion portion 212b. The top of the protrusion portion 212b has at least two hooks 216, and a notch 217 exists between the hooks 216, in which the notch 217 is suitable for accommodating the deformed hooks 216. The washer 230b has a center hole 231b. Upon assembling, the ring filter 220 is first disposed on the fixing base 210b, and then the center hole 231b penetrates the protrusion portion 212b by the elastic deformation of the hooks 216, such that the washer 230b is fit on the protrusion portion 212b. At this time, the hooks 216 are pressed on the washer 230b, and thus the washer 230b and the ring filter 220 are fixed on the fixing base 210b. It should be noted that, in the present invention, the connection of the washer to the fixing base is not limited.

Figure 7A:
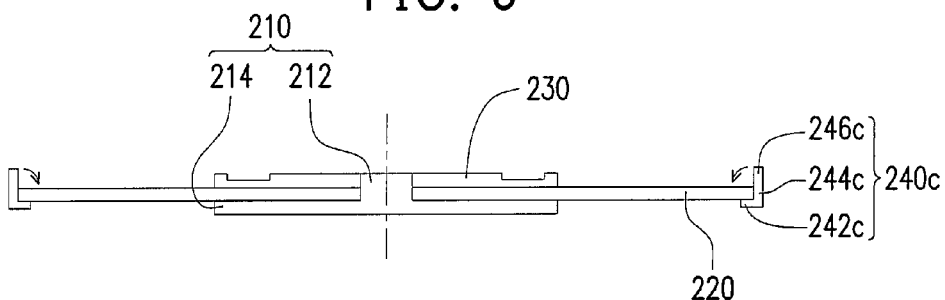
FIGS. 7A and 7B are schematic assembly views of a color wheel according to a third embodiment of the present invention.
Figure 7B:
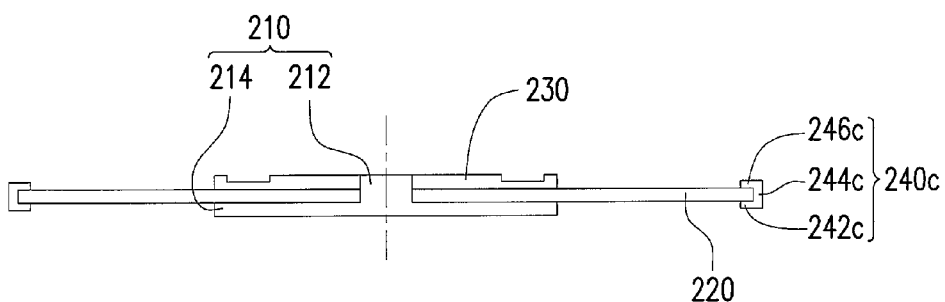
Figure 8:
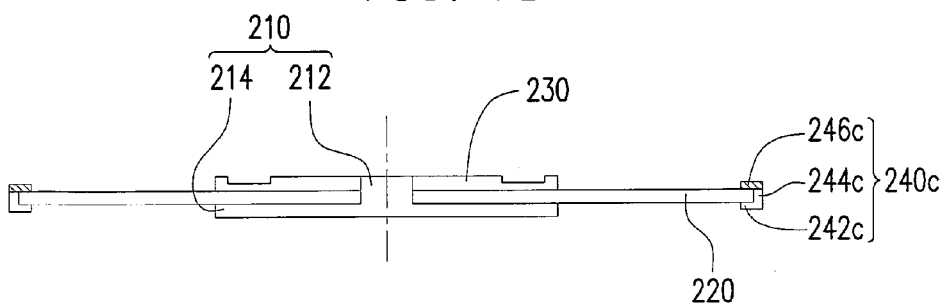
FIG. 8 is a schematic view of another color wheel according to the third embodiment of the present invention.
Figure 9A:
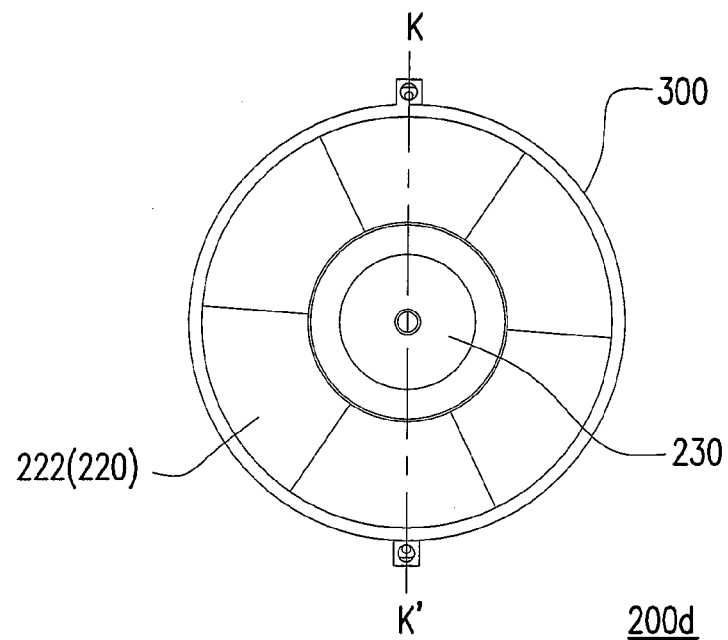
FIG. 9A is a top view of a color wheel according to a fourth embodiment of the present invention.
Figure 9B:
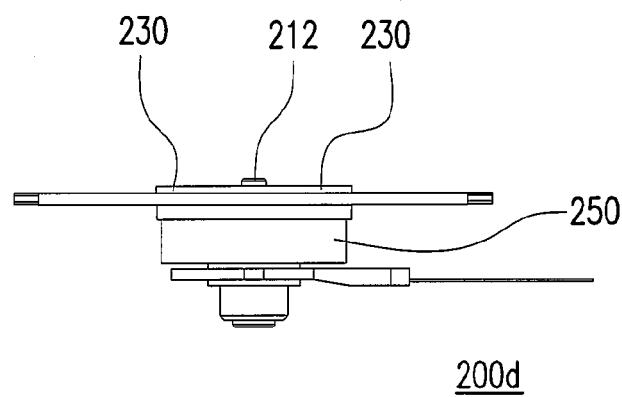
FIG. 9B is a side view of the color wheel in FIG. 9A.
Figure 10:
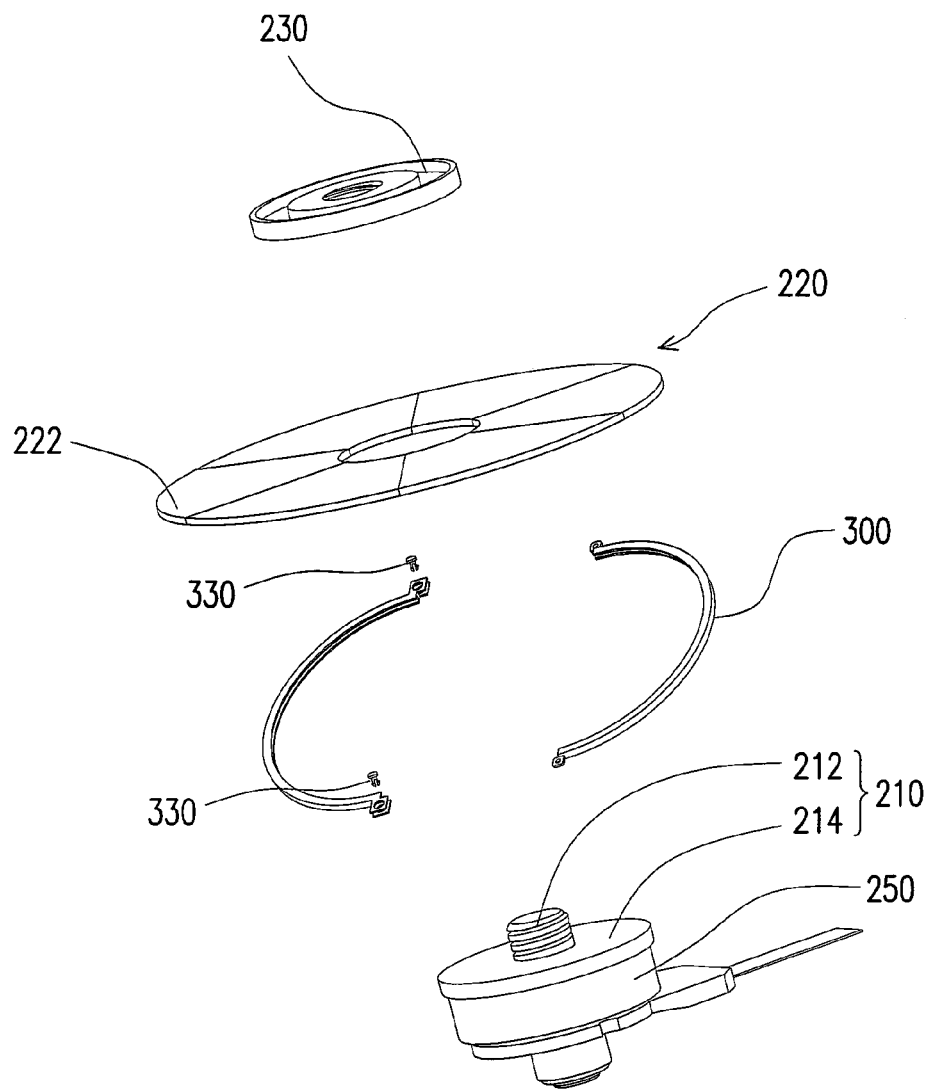
FIG. 10 is an exploded view of the color wheel in FIG. 9A.

The fixing blocks 246 are fixed onto the side wall 244 and the ring filter 220 by means of adhesion, bending, welding, or fusion, and so on. For example, in the manner of adhesion, referring to FIG. 3, the fixing blocks are a plurality of adhesives, such as solid adhesives or ultraviolet curing adhesives. The adhesives are dotted on the joints 223 of the sub-filters 222, so as to fix by the adhesiveness of the adhesives. In the manner of bending, referring to FIGS. 7A and 7B, the fixing blocks 246c, the side wall 244c, and the annular supporting portion 242c are integrally formed, and the material thereof is, for example, aluminum or other metals. Before assembling, the side wall 244c and the annular supporting porting 242c are formed first, and then, a portion of the side wall 244c is bent towards the ring filter 220 until being pressed on the joint 223 of two adjacent sub-filters 222, so as to form the fixing blocks 246c (as shown in FIG. 7B). While in welding scheme, referring to FIG. 8, the fixing blocks 246c, the side wall 244c, and the annular supporting portion 242c are formed by the same material (for example, metal or plastic), and the side wall 244c and the annular supporting portion 242c are integrally formed. The granular fixing blocks 246c are first dotted on the joints 223 of the sub-filters 222, and then connected to the side wall 244c by welding or fusion, in which the fixing blocks 246c made of metal are fixed by welding, while the fixing blocks 246c made of plastic are fixed by fusion.

Second Embodiment

Referring to FIGS. 9A, 9B, 10, and 11A, the difference between a color wheel 200d of a second embodiment of the present invention and the color wheel 200 of the first embodiment lies in the fixing ring. It should be pointed out that, in the second and first embodiments, identical components are represented by the same symbols. The difference between the two embodiments is illustrated in detail below, and the similarities thereof will not be described herein again. In particular, the inner wall of the fixing ring 300 of the color wheel 200d has an annular groove 302, the outer margin of the ring filter 220 is located in the annular groove 302, and the two opposite side walls of the annular groove 302 are capable of clipping the outer margin of the ring filter 220. The annular groove 302 avoids axial displacement of the ring filter 220, so as to secure the ring filter 220 and reduce the possibility of coming loose due to the centrifugal force when the color wheel 200 is rotated at a high speed.

Figure 11B:
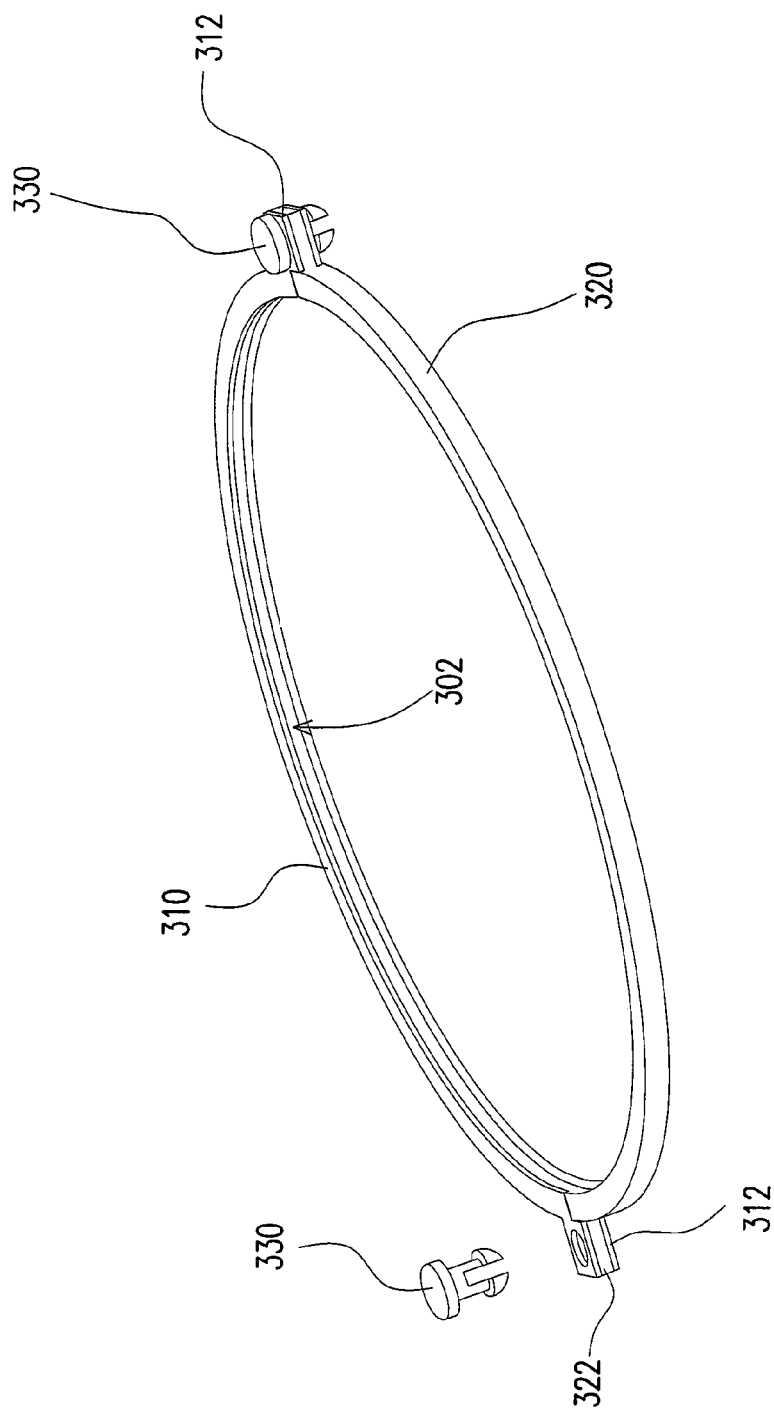
FIG. 11B is a combination diagram of the fixing ring in FIG. 9A.
Figure 11C:
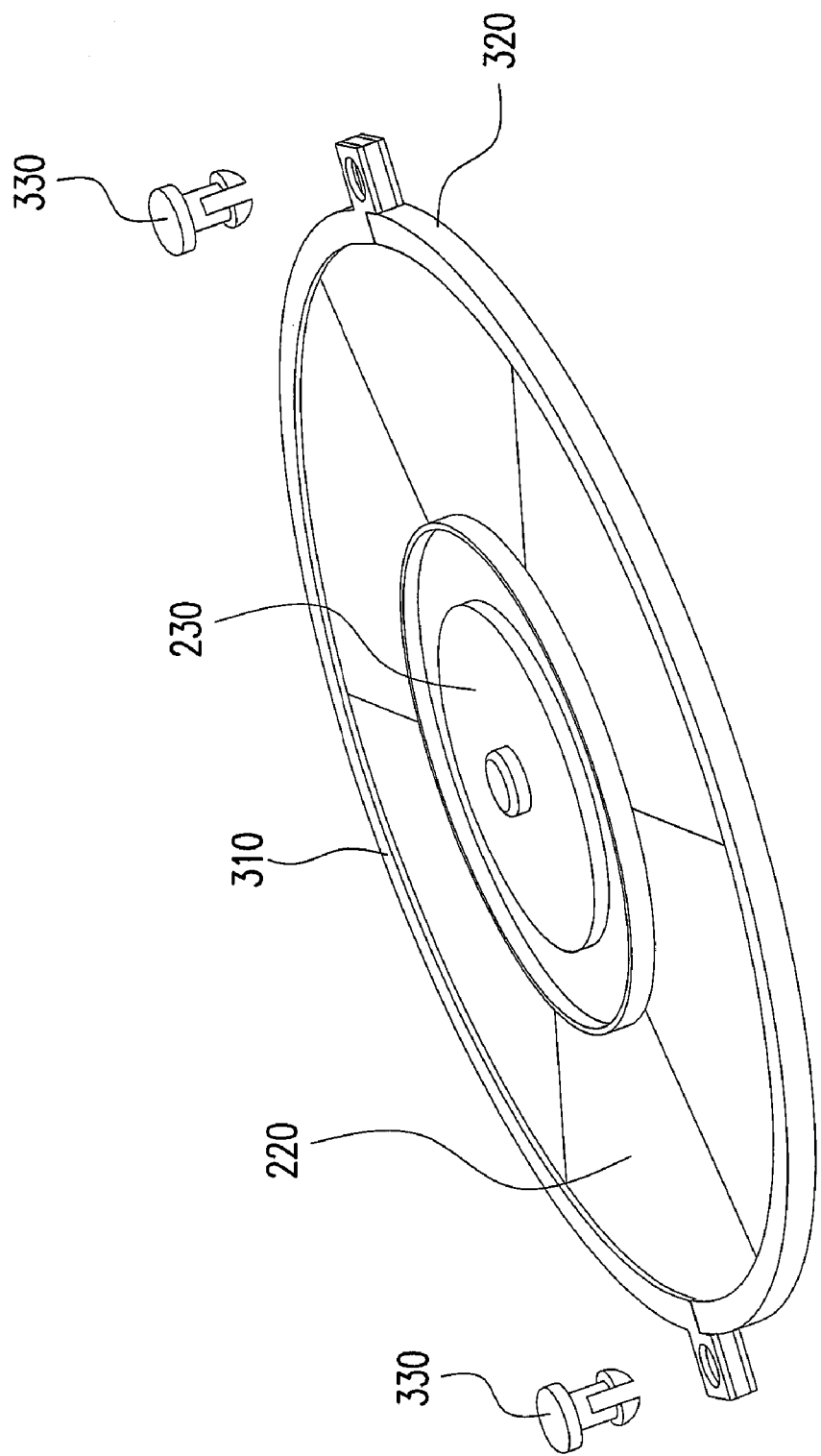
FIG. 11C is a schematic view of assembling the ring filter in FIG. 9A to the fixing ring.

Referring to FIGS. 11A to 11C, the fixing ring 300 includes a first half-ring 310, a second half-ring 320 connected to the first half-ring 310, and two fixing members 330. Each of two ends of the first half-ring 310 has a first joint portion 312, each of two ends of the second half-ring 320 has a second joint portion 322, and each of the first joint portions 312 is joined with one of the second joint portions 322. Each of the first joint portions 312 has a first through hole 312a, each of the second joint portions 322 has a second through hole 322a, and each of the fixing members 330 penetrates the first through hole 312a and the second through hole 322a of each joined first and second joint portions 312, 322.

During the assembly of the fixing ring 300 and the ring filter 220, the first half-ring 310 and the second half-ring 320 are fixed with the fixing members 330 after the alignment of the first half-ring 310 and the second half-ring 320. In addition, in this embodiment, first, a fixing member 330 penetrates the first through hole 312a of one of the first joint portions 312 and the second through hole 322a of the corresponding second joint portion 322, so as to form a pivot (as shown in FIG. 11B). As such, the subsequent assembly is completed merely by fixing another first joint portion 312 to the corresponding second joint portion 322 with the fixing member 330.

Referring to FIG. 11B, the fixing members 330 are, for example, fasteners, which penetrate the first through holes 312a and the second through holes 322a to fix the first half-ring 310 and the second half-ring 320. In addition, the fixing members are also screws, and the inner sides of the first through holes 312a and the second through holes 322a have threads, such that the fixing members 330 are locked in the first through holes 312a and the second through holes 322a. It should be noted that, in the present invention, an adhesive is applied to the joints of the first half-ring 310 and the second half-ring 320, so as to adhere the first half-ring 310 and the second half-ring 320.

In addition, the color wheel 200d further includes a buffer member disposed between the outer margin of the ring filter 220 and the bottom of the annular groove 302, used for tightly clipping the ring filter 220 so that the possibility of damage to the ring filter 220 caused by collision is effectively reduced. The buffer member is made of, for example, but not limited to, rubber or silica gel.

In this embodiment, as the fixing ring 300 is formed by the first half-ring 310 and the second half-ring 320, it is easy to assemble the color wheel 200d, thereby improving the assembly efficiency.

In view of above, the color wheel of the present invention at least has the following advantages:

1. By using the fixing ring to clip the ring filter, the axial displacement of the ring filter is effectively avoided, and the sub-filters in the ring filter is effectively secured and the possibility of coming loose due to the centrifugal force when the color wheel is rotated at a high speed is effectively reduced.

2. The buffer member makes the ring filter, the fixing base, and the fixing ring securely joined.

3. The fixing ring can be formed by two half-rings, so it is easy to assemble the color wheel, and the assembly efficiency is thus improved.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A color wheel, comprising:
   a fixing base, having a protrusion portion and a supporting portion;
   a ring filter, fit on the protrusion portion, an inner margin of the ring filter leaning on the supporting portion;
   a washer, connected to the protrusion portion, the ring filter being disposed between the washer and the supporting portion, and the washer and the supporting portion being capable of clipping the inner margin of the ring filter, wherein a top of the protrusion portion has at least two hooks, the washer has a center hole fit on the protrusion portion, the hooks are pressed on the washer, a notch is between the hooks, and the notch is suitable for accommodating the deformed hooks; and
   a fixing ring, having an annular supporting portion, a side wall surrounding the annular supporting portion, and a plurality of fixing blocks connected to the side wall, the fixing blocks being dotted on an outer margin of the ring filter, the outer margin of the ring filter leaning on the annular supporting portion, and the fixing blocks, the side wall, and the annular supporting portion being capable of clipping the outer margin of the ring filter.

2. The color wheel as claimed in claim 1, wherein the ring filter is formed by a plurality of sector sub-filters, and a joint exists between two adjacent sub-filters.

3. The color wheel as claimed in claim 2, wherein the fixing blocks are dotted on the joints.

4. The color wheel as claimed in claim 2, wherein one end of each fixing block is connected to the side wall, and another end is pressed on the corresponding joint.

5. The color wheel as claimed in claim 1, wherein the annular supporting portion, the side wall, and the fixing blocks are integrally formed.

6. The color wheel as claimed in claim 5, wherein the annular supporting portion, the side wall, and the fixing blocks are formed by metal or plastic.

7. The color wheel as claimed in claim 1, wherein the fixing blocks are formed by solid adhesive, ultraviolet curing adhesive, metal, or plastic.

8. The color wheel as claimed in claim 1, wherein the washer and the fixing base are integrally formed, an accommodation space is formed between the washer, the protrusion portion, and the supporting portion, and the inner margin of the ring filter is disposed in the accommodation space.

9. The color wheel as claimed in claim 1, wherein a top surface of the protrusion portion of the fixing base is pressed by a bottom surface of the washer for forming an accommodation space between the washer, the protrusion portion, and the supporting portion, and the inner margin of the ring filter is disposed in the accommodation space.

10. The color wheel as claimed in claim 1, further comprising a buffer member disposed between the inner margin of the ring filter and the protrusion portion, or between the outer margin of the ring filter and the side wall.

11. The color wheel as claimed in claim 1, further comprising a motor, wherein the motor has a rotating disk and a rotating shaft, the supporting portion of the fixing base is a surface of the rotating disk, and the protrusion portion is the rotating shaft.

12. The color wheel as claimed in claim 1, further comprising a motor, wherein the fixing base is connected to the motor.

13. A color wheel, comprising:
   a fixing base, having a protrusion portion and a supporting portion;
   a ring filter, fit on the protrusion portion, an inner margin of the ring filter leaning on the supporting portion;
   a washer, connected to the protrusion portion, the washer and the supporting portion being capable of clipping the inner margin of the ring filter; and
   a fixing ring, having an annular groove on a inner wall of the fixing ring, an outer margin of the ring filter being located in the annular groove, and two opposite side walls of the annular groove being capable of clipping the outer margin of the ring filter, wherein the fixing ring comprises a first half-ring, a second half-ring connected to the first half-ring, and two fixing members, each of two ends of the first half-ring has a first joint portion, each of two ends of the second half-ring has a second joint portion, and each of the first joint portions is joined to one of the second joint portions with one of the fixing members, the fixing members are screws or fasteners, each of the first joint portions has a first through hole, each of the second joint portions has a second through hole, and each of the fixing members penetrates the first through hole and the second through hole of each joined first and second joint portions.

14. The color wheel as claimed in claim 13, further comprising a buffer member disposed between the outer margin of the ring filter and a bottom of the annular groove.

\* \* \* \* \*